(12) United States Patent
Sivakumar (10) Patent No.: US 12,509,066 B2
(45) Date of Patent: Dec. 30, 2025

(54) WEATHER-DEPENDENT DRIVER ASSISTANCE SYSTEM

(71) Applicant: JAGUAR LAND ROVER LIMITED, Coventry (GB)

(72) Inventor: Ravi Shankar Sivakumar, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 191 days.

(21) Appl. No.: 18/281,560

(22) PCT Filed: Mar. 9, 2022

(86) PCT No.: PCT/EP2022/056046
§ 371 (c)(1),
(2) Date: Sep. 11, 2023

(87) PCT Pub. No.: WO2022/189512
PCT Pub. Date: Sep. 15, 2022

(65) Prior Publication Data
US 2024/0300481 A1    Sep. 12, 2024

(30) Foreign Application Priority Data
Mar. 10, 2021    (GB) ...................................... 2103309

(51) Int. Cl.
*B60W 30/09*    (2012.01)
*B60Q 9/00*    (2006.01)
(Continued)

(52) U.S. Cl.
CPC ............. *B60W 30/09* (2013.01); *B60Q 9/008* (2013.01); *B60S 1/0822* (2013.01); *B60W 40/06* (2013.01);
(Continued)

(58) Field of Classification Search
CPC ...... B60W 30/09; B60W 40/02; B60W 40/06; B60W 40/068; B60W 60/00;
(Continued)

(56) References Cited

U.S. PATENT DOCUMENTS 5,454,442 A * 10/1995 Labuhn ............... B60K 31/0008
340/904
5,521,579 A * 5/1996 Bernhard ........ B60W 30/18163
340/438
(Continued)

FOREIGN PATENT DOCUMENTS

DE         3637165 A1    5/1988
DE    102004060029 A1 *  7/2005    ......... B60K 31/0008
(Continued)

OTHER PUBLICATIONS

DE-102004060029-A1 machine translation (Year: 2004).*
(Continued)

*Primary Examiner* — Angelina M Shudy
(74) *Attorney, Agent, or Firm* — TROUTMAN PEPPER LOCKE LLP; Dustin B. Weeks; Nicholas H. Doss (57) ABSTRACT

A control system (200) for a vehicle (1), the control system comprising one or more controllers (201), wherein the control system is configured to:
receive (402) information indicative of a weather condition; and
in dependence on the information indicative of a weather condition, modify (406) at least one spatial range parameter of a driver assistance system configured to monitor other road users.

20 Claims, 3 Drawing Sheets

(51) Int. Cl.
 B60S 1/08 (2006.01)
 B60W 40/06 (2012.01)
(52) U.S. Cl.
 CPC ... *B60W 2520/10* (2013.01); *B60W 2554/801* (2020.02); *B60W 2555/20* (2020.02); *B60W 2754/20* (2020.02)
(58) Field of Classification Search
 CPC ....... B60W 60/0015; B60W 60/00182; B60W 2754/20; B60W 2555/20; B60W 2554/801; B60W 2520/10; B60W 30/085; B60W 30/095; B60W 30/0956; B60W 40/064; B60W 50/14; B60W 2554/802; B60W 2050/0075; B60W 2050/146; B60W 2420/403; B60W 2540/215; B60Q 9/008; B60S 1/0822; G08G 1/167; B60T 2201/022; B60T 2201/12; B60T 2210/34; B60T 2260/06; B60T 7/22
 See application file for complete search history.

(56) References Cited

U.S. PATENT DOCUMENTS

| | | | | |
|---|---|---|---|---|
| 6,590,495 | B1* | 7/2003 | Behbehani | G01S 13/931 340/904 |
| 7,741,961 | B1* | 6/2010 | Rafii | G06T 7/70 348/148 |
| 8,044,789 | B2* | 10/2011 | Daura Luna | G01S 17/931 348/148 |
| 8,255,155 | B1* | 8/2012 | Crane | G01C 21/3697 340/905 |
| 9,925,872 | B1* | 3/2018 | Alasry | B60W 50/12 |
| 10,300,851 | B1* | 5/2019 | Kim | G06T 7/11 |
| 10,377,380 | B2* | 8/2019 | Williams | G08G 1/167 |
| 10,852,746 | B2* | 12/2020 | Silver | G05D 1/0214 |
| 11,417,215 | B2* | 8/2022 | Cho | G01S 17/86 |
| 11,526,721 | B1* | 12/2022 | O'Malley | G06F 30/15 |
| 11,572,014 | B1* | 2/2023 | Chang | G08G 1/0129 |
| 11,749,116 | B1* | 9/2023 | Young | B60K 35/28 340/932.2 |
| 12,296,750 | B2* | 5/2025 | Baur | B60R 1/23 |
| 2002/0005778 | A1* | 1/2002 | Breed | G02B 27/01 340/436 |
| 2004/0178892 | A1* | 9/2004 | Anderson | B60Q 1/2665 340/435 |
| 2004/0183662 | A1* | 9/2004 | Baerenweiler | G01S 17/931 180/167 |
| 2007/0009137 | A1* | 1/2007 | Miyoshi | B60R 1/31 382/104 |
| 2007/0297288 | A1* | 12/2007 | Boecker | G08G 1/167 367/96 |
| 2008/0044224 | A1* | 2/2008 | Bleiner | G08G 1/09671 404/9 |
| 2008/0119993 | A1* | 5/2008 | Breed | G01S 7/023 701/45 |
| 2008/0169938 | A1* | 7/2008 | Madau | G08G 1/167 340/901 |
| 2009/0210257 | A1* | 8/2009 | Chalfant | B60W 40/09 705/4 |
| 2011/0090073 | A1* | 4/2011 | Ozaki | G08G 1/167 340/435 |
| 2013/0100287 | A1* | 4/2013 | Chien | G08G 1/167 348/148 |
| 2016/0311423 | A1* | 10/2016 | Storm | B60L 50/40 |
| 2016/0355178 | A1* | 12/2016 | Shiraishi | B60W 60/001 |
| 2017/0101096 | A1* | 4/2017 | Kim | B60W 30/16 |
| 2017/0168489 | A1* | 6/2017 | Rander | G01C 21/26 |
| 2017/0168495 | A1* | 6/2017 | Wood | B60W 10/184 |
| 2017/0176990 | A1* | 6/2017 | Keller | G01S 17/42 |
| 2018/0052457 | A1* | 2/2018 | Kim | B60W 30/00 |
| 2018/0079424 | A1* | 3/2018 | Myers | B60W 30/02 |
| 2018/0322781 | A1* | 11/2018 | Öhman | B60L 53/00 |
| 2019/0359058 | A1* | 11/2019 | Sato | B60R 21/01516 |
| 2020/0031278 | A1* | 1/2020 | Zafeirakis | H04N 7/18 |
| 2020/0191069 | A1* | 6/2020 | Naidu | F02D 41/2451 |
| 2020/0310418 | A1* | 10/2020 | Kanoh | B62D 15/0285 |
| 2020/0394918 | A1* | 12/2020 | Chen | G01C 21/3811 |
| 2020/0410062 | A1* | 12/2020 | O'Malley | B60W 60/001 |
| 2021/0001861 | A1* | 1/2021 | Lobey | B60W 40/068 |
| 2021/0107488 | A1* | 4/2021 | Jeong | G01S 17/931 |
| 2021/0213946 | A1* | 7/2021 | Adwan | G01S 13/878 |
| 2021/0233407 | A1* | 7/2021 | Schondorf | B60R 11/04 |
| 2021/0261162 | A1* | 8/2021 | Hiramatsu | G08G 1/167 |
| 2022/0036730 | A1* | 2/2022 | Ueda | G06F 18/25 |
| 2022/0284816 | A1* | 9/2022 | Ho | G01S 13/931 |
| 2022/0314886 | A1* | 10/2022 | Oigawa | G02B 27/0101 |
| 2022/0410940 | A1* | 12/2022 | Nishioka | G16Y 10/40 |
| 2023/0015466 | A1* | 1/2023 | Jiralerspong | G01C 21/3407 |
| 2023/0060112 | A1* | 2/2023 | Marumo | B60W 30/18172 |
| 2023/0264704 | A1* | 8/2023 | Menner | B60W 30/12 701/1 |
| 2023/0342434 | A1* | 10/2023 | Schneider | G06V 20/56 |
| 2023/0347921 | A1* | 11/2023 | Iwahashi | B60W 50/14 |
| 2023/0410655 | A1* | 12/2023 | Hwang | G08G 1/0141 |
| 2024/0013549 | A1* | 1/2024 | Xie | G01S 7/4813 |
| 2024/0043009 | A1* | 2/2024 | Igarashi | B60W 30/0956 |
| 2024/0326694 | A1* | 10/2024 | Pan | B60R 1/22 |
| 2025/0058770 | A1* | 2/2025 | Larsson | B60W 40/09 |
| 2025/0065894 | A1* | 2/2025 | Luo | B60W 50/0205 |
| 2025/0083677 | A1* | 3/2025 | Thum | B60W 30/18163 |

FOREIGN PATENT DOCUMENTS

| | | | | |
|---|---|---|---|---|
| DE | 102006057744 | A1 * | 7/2008 | ......... B60T 8/17551 |
| EP | 1612082 | A1 | 1/2006 | |
| EP | 3153366 | A1 | 4/2017 | |
| JP | 2020121575 | A * | 8/2020 | |

OTHER PUBLICATIONS

DE-102006057744-A1 machine translation (Year: 2006).*
JP-2020121575-A machine translation (Year: 2020).*
International Search Report and Written Opinion for Application No. PCT/EP2022/056046, dated Jun. 24, 2022, 12 pages.
Combined Search and Examination Report for Application No. GB2103309.7, dated Dec. 3, 2021, 11 pages.

* cited by examiner

WEATHER-DEPENDENT DRIVER ASSISTANCE SYSTEM

TECHNICAL FIELD

The present disclosure relates to a weather-dependent driver-assistance system for a vehicle. In particular, but not exclusively it relates to a rain and/or fog-dependent driver assistance system, wherein the driver assistance system is configured to monitor other road users.

BACKGROUND

During heavy rain or foggy conditions there is a chance that a driver might not be confident of the locations of other road users in relation to his or her vehicle. This is because the side windows and side mirrors of the vehicle could be covered in water droplets, and in foggy conditions the other road user might not be visible.

Similarly, some driver assistance sensors such as radars may output noisier signals in rainy conditions.

SUMMARY OF THE INVENTION

It is an aim of the present invention to provide improved driver assistance. The invention is as defined in the appended independent claims.

According to an aspect of the invention there is provided a control system for a vehicle, the control system comprising one or more controllers, wherein the control system is configured to: receive information indicative of a weather condition; and in dependence on the information indicative of a weather condition, modify at least one spatial range parameter of a driver assistance system configured to monitor other road users.

In some examples, the information is configured to indicate a wet driving condition.

In some examples, the information configured to indicate a wet driving condition is dependent on at least one of: information from a sensor configured to detect droplet presence; a windscreen wiper state; or traction information configured to indicate a loss of traction due at least partially to a wet road.

In some examples, modifying the spatial range parameter is enabled when a windscreen wiper arrangement is automatically controlled due to rain-sensing, but not when the windscreen wiper arrangement is manually controlled.

In some examples, the information is configured to indicate fog.

In some examples, the information configured to indicate fog is dependent on at least one of: a fog lamp state; or an output of a sensor configured to detect fog.

In some examples, the information is indicative of an intensity of the weather condition, and wherein the control system is configured to modify the spatial range parameter by different extents in dependence on the intensity.

In some examples, the control system is configured to not modify the spatial range parameter when the information indicates a first, relatively low intensity greater than a zero intensity, and is configured to modify the spatial range parameter when the information indicates a second, relatively high intensity.

In some examples, the spatial range parameter comprises a trigger range for triggering an action based on a detected range of another road user.

In some examples, the control system is configured to increase the trigger range in dependence on the information indicating an adverse weather condition, and not increase the trigger range in dependence on the information not indicating an adverse weather condition.

In some examples, the action comprises a driver alert related to another road user.

In some examples, the driver assistance system comprises at least one of: a blind spot monitoring function; a cross-traffic function; or a pre-crash function.

In some examples, the driver assistance system comprises a blind spot monitoring function, wherein the spatial range parameter comprises an exit condition range for ending a blind spot monitoring action. The control system may be configured, in dependence on the information indicating an adverse weather condition, to move the exit condition range to a point at which the rear of a passing road user no longer overlaps the vehicle when viewed in the lateral direction. The exit condition range may be defined, at least in part, by a laterally extending line with respect to the vehicle hosting the control system. The rear of a passing road user may be defined by a rearmost surface of a rear bumper of a passing vehicle.

The control system may be configured, in dependence on the information not indicating an adverse weather condition, to set the exit range condition such that when the front of the passing road user reaches the exit condition range, the passing road user is no longer in a rear quarter blind spot of the host vehicle. The front of a passing road user may be defined by a forwardmost surface of a front bumper of a passing vehicle.

In some examples, the driver assistance system comprises a pre-crash function and wherein the action comprises at least one of: a collision avoidance action; or a collision mitigation action.

In some examples, the spatial range parameter comprises a trigger range for triggering an action based on a detected range of another road user, wherein the control system is configured to increase the trigger range in dependence on the information indicating an adverse weather condition, and not increase the trigger range in dependence on the information not indicating an adverse weather condition, wherein the driver assistance system comprises a pre-crash function and wherein the action comprises at least one of:
  a collision avoidance action; or
  a collision mitigation action.

In some examples, the collision mitigation action comprises at least one of: seatbelt pre-tensioning; window closing; sunroof closing; headrest movement; seat repositioning; airbag pre-deployment; hydraulic brake prefilling; or active suspension adjustment.

In some examples, the collision avoidance action comprises at least one of: autonomous emergency braking; or driver braking assistance.

In some examples, the spatial range parameter comprises an exit condition range for ending a blind spot monitoring action and/or for ending a cross-traffic action, based on completed passage of the another road user.

In some examples, the driver assistance system comprises an autonomous driving function.

In some examples, the spatial range parameter comprises a following separation parameter of the autonomous driving function, for controlling a separation of the vehicle behind a followed road user.

In some examples, the control system is configured to increase the following separation parameter in dependence on the information indicating an adverse weather condition, and not increase the following separation parameter in dependence on the information not indicating an adverse weather condition.

In some examples, the information is configured to indicate a snowy and/or icy surface condition, and wherein the information comprises a selected terrain mode.

In some examples, the spatial range parameter comprises at least one of: a distance to another road user; or a time for another road user to reach a predetermined location.

According to a further aspect of the invention there is provided a vehicle comprising the control system.

According to a further aspect of the invention there is provided a method of controlling a driver assistance system of a vehicle, the method comprising: receiving information indicative of a weather condition; and in dependence on the information indicative of a weather condition, modifying at least one spatial range parameter of a driver assistance system configured to monitor other road users.

According to a further aspect of the invention there is provided computer software that, when executed, is arranged to perform one or more of the methods described herein. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
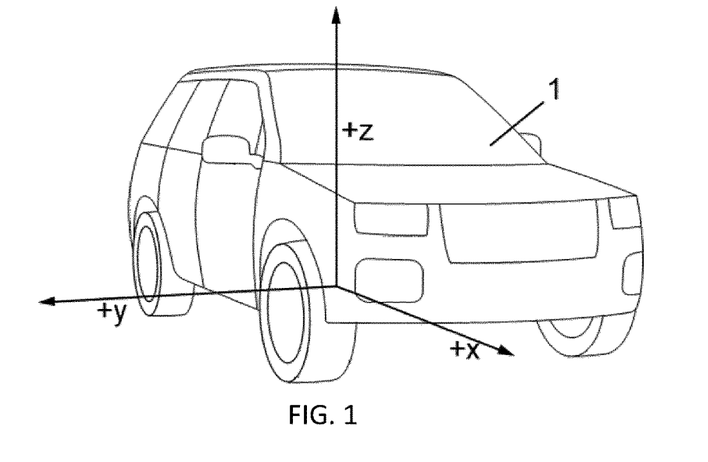
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

FIG. 1 is a front perspective view and illustrates a longitudinal x-axis between the front and rear of the vehicle 1, an orthogonal lateral y-axis between left and right lateral sides of the vehicle 1, and a vertical z-axis. A forward direction typically faced by a driver's seat is in the positive x-direction; rearward is-x. A rightward direction as seen from the driver's seat is in the positive y-direction; leftward is-y. These are a first lateral direction and a second lateral direction.

The vehicle 1 can host one or more driver assistance systems, also referred to as Advanced driver-assistance systems (ADAS). Driver assistance systems are electronic systems that assist drivers in driving and/or automate parts of driving tasks. ADAS systems use automated technology, such as obstacle detection sensors (radar/camera/lidar/ultrasonic) to detect nearby obstacles or to detect other hazards. ADAS systems are able to perform one or more of:

processing driver inputs and optionally alerting the driver to a hazard or opportunity via a human-machine interface (HMI);

longitudinal vehicle control (automated acceleration and/or automated braking);

lateral vehicle control (automated steering); or collision mitigation actions such as seatbelt pre-tensioning.

Examples of driver assistance systems include: a blind spot monitoring function; a cross-traffic function; a pre-crash function; or an autonomous driving function, among others. These will each be described in the following paragraphs.

An example of a blind spot monitoring function is a function that monitors an area behind and to the sides of the host vehicle 1 including blind spots, and renders an alert to a driver if another road user is in a blind spot or is quickly approaching a blind spot. The monitored area may comprise a rear quarter blind spot of the host vehicle 1. The width and lateral position of each monitored area can be in the order of two to four metres laterally from the nearest side of the host vehicle 1, so that an adjacent traffic lane is monitored but not the traffic lane after the adjacent traffic lane.

The alert can be a visual alert. The visual alert can be displayed by any suitable display device such as a side mirror-mounted display device. The visual alert can be any suitable indication of the hazard to the driver such as a flashing icon. If the other road user is behind and to the left side of the host vehicle 1, the alert can be rendered at a left-side mirror. If the other road user is behind and to the right side of the host vehicle 1, the alert can be rendered at a right-side mirror. These are just some examples of possible types of alert.

The proximity of the other road user to the host vehicle 1 can be detected by an appropriate obstacle detection sensor such as one or more of a visual light camera, a radar sensor, a lidar sensor, or an ultrasonic sensor, having a field of view covering the monitored area. An obstacle detection sensor can be rear bumper-mounted/body mounted, for example. Such sensors enable a determination that the other road user is within or approaching the monitored area.

The alert is rendered when the approaching other road user is within a trigger range for triggering the alert. Once the other road user has passed a deactivation range, the alert stops being rendered. In other words, the deactivation range acts as a spatial or spatiotemporal exit condition. The way in which the trigger range and the deactivation range are defined depends on the type of blind spot monitoring function.

In some examples the blind spot monitoring function comprises a blind spot warning function, which triggers the rendering of the alert in dependence on a suitable spatial range parameter such as the longitudinal x-axis separation distance to the other road user from the host vehicle 1. The closing speed of the other road user may not be taken into account. Therefore, the trigger range and deactivation range can be expressed as a longitudinal distance.

The trigger range can correspond to a longitudinal distance of a front reference location of the other road user (e.g. front bumper) from a reference location on the host vehicle (e.g. rear wheels/rear bumper/putative driver's head location). The longitudinal distance can have a value selected from the range of approximately one metre to approximately 25 metres depending on the implementation. When another road user is detected to be within this distance, the alert is triggered.

The deactivation range for deactivating the alert can correspond to a longitudinal distance of a rear reference location of the other road user (e.g. rear bumper) from a reference location on the host vehicle (e.g. rear or front wheels/bumpers, or putative driver's head location). The longitudinal distance can have a value selected from the range of zero metres to approximately six metres depending on the implementation. The value is chosen so that the trigger range for activating the alert is satisfied by a passing road user before the deactivation range is satisfied for deactivating the alert, and so that the alert is deactivated when other road user has passed the blind spot of the host vehicle.

An enhancement of the blind spot warning function is a closing vehicle sensing function, configured to take into account the rate of closure of the passing other road user in the adjacent traffic lane. The trigger range can be expressed as a suitable spatial range parameter dependent on closing speed and separation distance, such as a closing time (e.g. time to collision) for the other road user to reach a predetermined location. The predetermined location can be a location alongside the host vehicle 1 in the monitored adjacent traffic lane where a collision would occur between the approaching road user and the host vehicle 1 if the host vehicle 1 were manoeuvred into the predetermined location in the other road user's path. The closing time can be extrapolated from a rate of change of the sensed separation distance. The trigger range can have a value corresponding to a closing time selected from the range approximately 2.5 seconds to approximately 4.5 seconds depending on the implementation. The alert can be rendered when the other road user comes within the trigger range, that is, the closing time falls below the above value (threshold).

For a closing vehicle sensing function the monitored area can be lengthened to greater than 30 metres (e.g. approximately 70 metres) depending on the detection range of the obstacle detection sensor (e.g. radar).

A further enhancement of the blind spot warning function or of the closing vehicle sensing function is a blind spot assist function. If a lane change manoeuvre of the host vehicle 1 is initiated when the other road user is within the trigger range as defined above, a counter-rotational force may be automatically applied by a steering actuator to a steering wheel of the host vehicle 1 to counter the driver's lane change. A visual and/or audio alert can also be rendered, such as an instrument cluster visual alert by an instrument cluster display device. The above side mirror alert could also be rendered.

The above blind spot monitoring functions can be active when one or more of the following conditions is satisfied:
    The host vehicle 1 is configured to move forward (forward gear engaged);
    The host vehicle speed is above a minimum threshold. The minimum threshold can depend on sensor capabilities. In some examples, the minimum threshold corresponds to a value less than 60 kilometres per hour for a blind spot warning function and/or a closing vehicle sensing function. The minimum threshold for the blind spot assist function can be faster than the minimum threshold for the blind spot warning function.
    The blind spot monitoring function can be dependent on a lane tracking system and will only function in the availability of any lane tracking system;
    The blind spot monitoring function has not been user-disabled (e.g. via an instrument cluster HMI); or
    A bend radius is below a threshold (e.g. indicated by sensed lateral acceleration and/or steering angle).

Moving on to the other driver assistance systems, a cross-traffic function is now described.

A specific example of a cross-traffic function is a rear cross-traffic monitor. This is useful when reversing out of a parking bay or driveway in a direction that is approximately perpendicular to the road. Walls or other parked vehicles may obstruct the driver's view, but not the field of view of a rearwardly-mounted object detection sensor of the host vehicle 1 (e.g. rear bumper obstacle detection sensors). The rear cross-traffic monitor can alert the driver to laterally-approaching other road users such as vehicles, pedestrians or cyclists, regardless of which lateral side of the host vehicle 1 is approached (left or right).

There are some similarities and some differences with respect to the blind spot monitoring function. The monitored area of the rear cross-traffic monitor can still be behind the host vehicle 1 but can be wider than the area defined for blind spot monitoring. For example, the y-axis width of the monitored area for each lateral side of the host vehicle 1 can correspond to a closing time of between two and four seconds. In an example non-limiting use case, the blind spot monitoring function can be triggered by another road user 40 metres away from the nearest lateral side of the host vehicle 1 and travelling at 20 metres per second.

The alert can be rendered differently than a blind spot monitoring function. The alert can still be visual and/or audio. In an example, the alert can be an instrument cluster visual alert. The visual alert can be overlaid onto a reverse camera feed on an instrument cluster display device, for example. The position or characteristics of the alert can specify the direction (left or right) from which the other road user is approaching.

Alternatively, or in addition, if the host vehicle 1 is capable of autonomous emergency braking (described later), then the cross-traffic trigger could cause the reversing host vehicle 1 to brake automatically, without user intervention. If an alert is also rendered, the braking can be initiated either at the same time as or just after the alert is started to be rendered.

The cross-traffic function could remove the alert and/or the braking when the rear of the other road user passes a deactivation point (spatial/spatiotemporal exit condition) along the x-axis and/or y-axis.

The above rear cross-traffic monitor can be active when one or more of the following conditions is satisfied:
- The host vehicle 1 is configured to move in reverse (reverse gear engaged);
- The host vehicle speed is below a threshold which can correspond to a value less than 25 kilometres per hour; or
- The rear cross-traffic monitor has not been user-disabled (e.g. via an instrument cluster HMI).

The same concept as a rear cross-traffic monitor can apply to a forward traffic monitor for monitoring a forward direction using sensors with forward-lateral fields of view. Therefore, the present disclosure refers to both functions generically a cross-traffic function.

Moving on to the other driver assistance systems, a pre-crash function is now described.

If a potential frontal collision with an object such as a vehicle or a pedestrian is detected by forward-facing obstacle detection sensors, the driver assistance system transmits an output signal to a brake actuator to cause brakes (typically hydraulically-actuated friction brakes) to be applied to help reduce the probability and severity of the possible collision. This is referred to as autonomous emergency braking. 'Autonomous' refers to the absence of a driver brake request, for example through a brake pedal/actuator. 'Emergency' refers to the interventional-nature of the event, indicating that the braking event is capable of triggering while the host vehicle 1 is under manual longitudinal control (e.g. cruise control is off).

In some examples, an alert can first be rendered, such as an instrument cluster visual alert comprising a forward collision warning on an instrument cluster display device, before the autonomous emergency braking is triggered. Whether an alert is rendered can depend on the speed of the host vehicle 1 and/or on the type of obstacle (pedestrian or other vehicle).

In some examples, autonomous emergency braking can be overridden by the driver actuating an accelerator such as an accelerator pedal and/or by turning the steering wheel.

The spatial range parameter for a pre-crash function can be a closing time, for example. In some examples, a potential frontal collision can be determined probabilistically. For example, at least one probability function can determine the trigger range (e.g. closing time) in dependence on probabilistic variables. Examples of probabilistic variables include future paths and/or future speeds. The range of possible values of the closing time trigger range can be between approximately 0.2 seconds and less than approximately 1.4 seconds in an implementation.

In another embodiment, driver braking assistance can be applied instead of autonomous emergency braking. Driver braking assistance can request more friction braking force than the driver is requesting through a brake pedal. In this example the driver braking assistance function requires an above-threshold driver brake request so the braking must be initiated manually.

Additionally, or alternatively, a pre-crash function can cause one or more collision mitigation actions to reduce the severity of a collision. Alerts and collision mitigation actions can be implemented before one or more of frontal collisions, side collisions or rear collisions. Examples of collision mitigation actions include:

- seatbelt pre-tensioning by a seatbelt pre-tensioner actuator;
- window closing (fully or partially) by an electric window actuator;
- sunroof closing (fully or partially) by an electric sunroof actuator;
- headrest movement forwards towards occupants' heads (frontal collisions);
- Airbag pre-deployment/prefilling, in an airbag module;
- Hydraulic brake prefilling for friction brakes, by a brake actuator configured to increase hydraulic brake pressure;
- seat repositioning to move seats forwards (frontal collisions) by a headrest adjustment actuator; or
- active suspension adjustment by an active suspension actuator, for example to tilt the host vehicle 1 against a direction of expected roll for an expected side collision.

The above pre-crash function can be active when one or more of the following conditions is satisfied:
- Host vehicle speed is within a predetermined limit or limits. A lower limit can be a speed greater than 0 km/h but less than 20 km/h. An upper limit can be a speed less than 100 km/h. The limits can be different depending on whether the detected object is a pedestrian or a vehicle;
- A stability control system is switched off; or
- The pre-crash function has not been user-disabled (e.g. via deactivation of a stability control system).

Moving onto the other driver assistance systems, an autonomous driving function is now described. In some, but not necessarily all examples the autonomous driving function comprises adaptive cruise control (ACC).

ACC is a version of cruise control that adapts host vehicle speed to the speed of a followed road user. Like normal cruise control, ACC will control a torque source such as an internal combustion engine and/or an electric machine to control the speed of the host vehicle 1 to match a speed target. The driver may set the speed target to match a current speed, and can then release the accelerator because the vehicle speed will be controlled to automatically maintain vehicle speed at the speed target. The driver can change the speed target during ACC, for example with digit (finger) controls.

The terms 'automatic' and 'autonomous' herein refer to functions that are able to operate without user intervention.

In some examples, the speed target adapts automatically in dependence on traffic sign recognition, if the host vehicle 1 is capable of traffic sign speed limit recognition (camera and processor equipped).

ACC is configured so that if the host vehicle 1 is approaching a preceding road user and the road user is travelling at a speed less than the speed target, the host vehicle 1 can automatically slow down to follow the road user. The other road user can be detected via an obstacle detection sensor as described above.

When following, ACC may control a following separation parameter such as a vehicle-to-vehicle (V2V) separation to the followed road user to maintain a target V2V separation or to avoid falling below a minimum V2V separation. If the other road user speeds up again, the host vehicle 1 will automatically speed up until the speed target is reached.

When following, the target V2V separation may be preset or user-configurable. The target V2V separation may be treated as a suitable spatial range parameter such as a separation time or as a speed-dependent separation distance. This ensures that the V2V separation distance increases as vehicle speed increases, to keep a constant time separation.

In ACC the driver may remain responsible for steering inputs and for supervision of ACC. In ACC, the driver may be able to manually longitudinally control the host vehicle 1 without deactivating ACC. A temporary manual increase in vehicle speed above the speed target may temporarily override conformance to the speed target and/or conformance to a particular V2V separation.

ACC may hand control back to the driver in various scenarios. A driver-initiated handover condition can comprise an above-threshold driver brake request and/or a driver deactivation of ACC via an HMI. A system-initiated handover condition can occur as a result of sensor failure, and/or as a result of dirt, snow or ice on the obstacle detection sensor. Example system-initiated handover conditions can be dependent on one or more of:

a sensor failure condition such as a diagnostic trouble code (DTC);

excessive false positive detections, for example based on the frequency with which tracked objects are lost; or occlusion of the obstacle detection sensor (e.g. radar/camera system).

A system-initiated handover can comprise rendering an alert prompting the driver to intervene. The alert can comprise an instrument cluster visual alert on an instrument cluster display device and/or an audio alert, for example. At around the same time, the system deactivates ACC.

Figure 2:
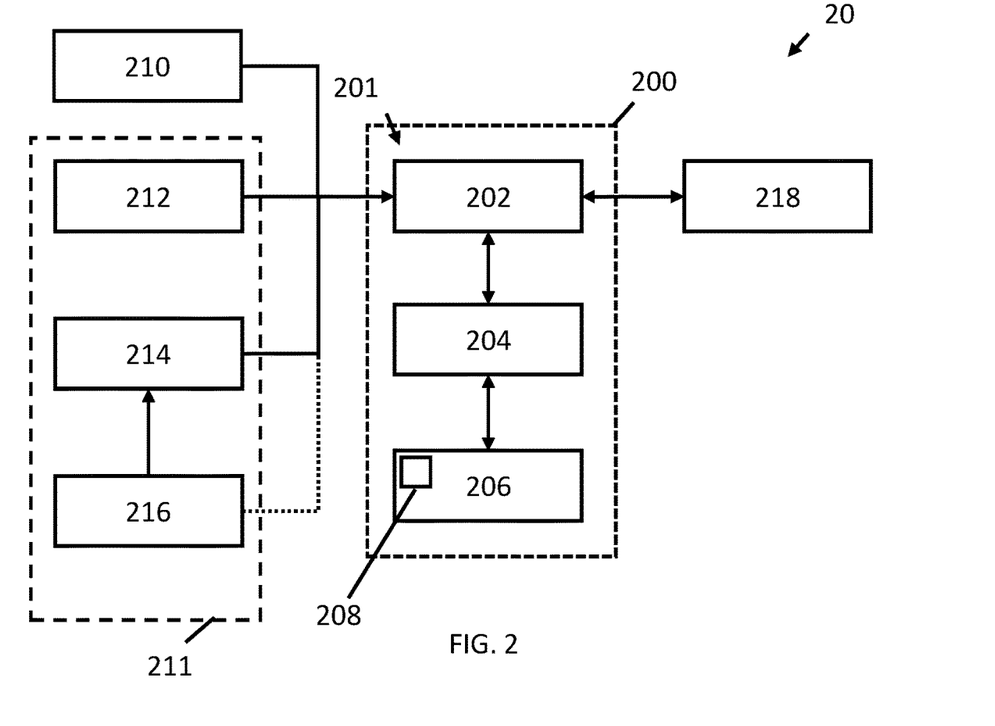
FIG. 2 illustrates an example of a driver assistance system.

FIG. 2 illustrates an example system architecture for managing one or more driver assistance systems. The illustrated system 20 comprises a control system 200. The control system 200 of FIG. 2 comprises a controller 201. In other examples, the control system 200 may comprise a plurality of controllers on-board and/or off-board the host vehicle 1. In some examples, a control system 200 or a controller 201 may be supplied along with one or more of the other components shown in FIG. 2 as part of the system 20.

The controller 201 of FIG. 2 includes at least one processor 204; and at least one memory device 206 electrically coupled to the electronic processor and having instructions 208 (e.g. a computer program) stored therein, the at least one memory device 206 and the instructions 208 configured to, with the at least one processor 204, cause any one or more of the methods described herein to be performed. The processor may have an interface such as an electrical input/output I/O 202 or electrical input for receiving information and interacting with external components.

Figure 3:
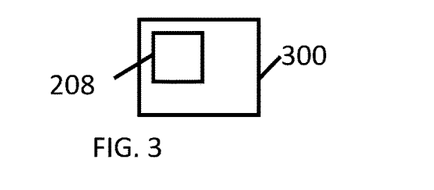
FIG. 3 illustrates an example of a non-transitory computer-readable storage medium.

FIG. 3 illustrates a non-transitory computer-readable storage medium 300 comprising the instructions (computer software).

The control system 200 is configured to receive information from one or more obstacle detection sensors 210 that are configured to enable detection of other road users such as vehicles and/or pedestrians. The obstacle detection sensors 210 can comprise one or more of a visual light camera, a radar sensor, a lidar sensor, or an ultrasonic sensor.

The control system 200 is configured to send output signals for causing the necessary assistance to be provided, in dependence on the information from the obstacle detection sensors 210. It will be understood from the earlier examples that the output signals from the control system 200 can be dependent on spatial range parameters such as a 'trigger range' for triggering alerts/braking, or a 'following separation parameter' for autonomous driving. For example, the control system 200 could initiate a side mirror alert based on another road user being within a trigger range of the blind spot monitoring function.

The output signals are directed towards one or more assistance devices 218 which can comprise one or more of:

For a blind spot monitoring function, the side mirror-mounted display device for one or both side mirrors, for rendering the alert;

For a blind spot assist function, the steering actuator such as an electronic power assisted steering (EPAS) motor;

For a, pre-crash function or ACC handover, the instrument cluster display device;

For a pre-crash function and/or cross-traffic function, one or more of: the brake actuator such as a brake servomotor; the seatbelt pre-tensioner actuator; the electric window actuator; the electric sunroof actuator; the headrest adjustment actuator; the active suspension actuator; or the seat-repositioning actuator;

For an autonomous driving function, one or more of: the torque source such as an internal combustion engine/electric machine; the brake actuator; or the EPAS motor.

According to an aspect of the present invention, different values of the spatial range parameters can be appropriate for different types of weather, to reflect the driver's level of confidence and situational awareness which is affected by wet/icy/fogged up windows or environmental fog. Therefore, information indicative of a weather condition is fused with the information from the obstacle detection sensors 210.

In an example use case, a more conservative trigger range can be used for blind spot monitoring when it is raining heavily, because rain droplets on a side mirror/rear view mirror camera/rear windscreen/side window in the driver's line of sight to the side mirror may reduce the driver's rear visibility.

Therefore, the illustrated control system 200 is further configured to receive information indicative of a weather condition from one or more weather information sources 211. The output signals of the control system 200 are dependent on the information indicative of a weather condition. In at least some examples, the spatial range parameters (e.g. trigger ranges, following separations) are modified based on the information.

First, examples of the weather information sources 211 are described.

One example of a weather information source 211 is a windscreen (windshield) wiper module 214 configured to control a windscreen wiper arrangement (not shown). The windscreen wiper arrangement controlled by the windscreen wiper module 214 can comprise a front windscreen wiper(s), or a rear windscreen wiper(s), or a combination thereof.

The windscreen wiper module 214 may be configured to output a signal indicative of windscreen wiper activity. The signal can comprise a state signal indicating the state of the windscreen wiper arrangement. The state signal can indicate at least one on-state when the windscreen wiper is active (wiping the windscreen). In some examples the state signal indicates an off-state when the windscreen wiper is inactive.

In some examples the state signal indicates one of a plurality of different on-states individually indicating a different wiper speed. In an implementation, at least three on-states or more can indicate at least three nonzero wiper speeds. The wiper speed generally indicates how wet the driving conditions are because each wiper speed generally corresponds to a different intensity (rate) of deposition of droplets on the windscreen. The droplets are typically deposited by ongoing precipitation (rain/snow), by spray from preceding vehicles, or a combination thereof.

In some examples the signal can be available to the control system 200 from a communication interface such as a Controller Area Network (CAN) bus or a Local Interconnect Network (LIN) bus, Flexray™. Optionally, the functionality of the windscreen wiper module 214 can be integrated into the control system 200.

In some, but not necessarily all examples, the weather-dependent methods described herein can be enabled when the windscreen wiper arrangement is automatically controlled due to rain-sensing, but not when the windscreen wiper arrangement is manually controlled. In an example, the state signal can discriminate between automatic control and manual control.

Rain sensing is enabled by any suitable rain sensor 216 configured to detect droplet presence on the window(s) of the host vehicle 1 that the windscreen wiper arrangement is configured to wipe. A suitable rain sensor is responsive to the rate of deposition of droplets on the sensed windscreen, typically due to ongoing precipitation and/or spray from preceding vehicles (whether it is raining or not). An example of a rain sensor 216 is an automotive infrared rain sensor. Sensor data from the rain sensor 216 can cause the windscreen wiper module 214 to control the wiper state automatically, without human intervention.

In another example, the methods described herein can utilize sensor data from the rain sensor 216 directly, rather than using the windscreen wiper state as a proxy measurement. However, the windscreen wiper state is more advantageous because it prevents a false positive associated with activation of windscreen washers. The windscreen wiper state can indicate when windscreen washing is occurring.

Manual control of the windscreen wipers can be via an HMI such as a wiper state selector on a stalk near the steering wheel, or a touchscreen HMI, for example. If the wiper state is changed by the wiper state selector HMI, the change of state may be ignored by the methods of this disclosure.

Rain/wetness is not the only adverse driving condition for user visibility. Environmental fog is another example. An example of a weather information source 211 configured to indicate fog is a fog lamp circuit 212 configured to control a fog lamp state. A state signal can be output from the fog lamp circuit 212 indicating whether the set of one or more fog lamps is active. If active, the presence of fog is inferred.

In some examples, the methods described herein can be enabled when the fog lamps are manually activated, for example via a fog lamp state selector HMI.

If the host vehicle 1 is equipped with automatic fog lamps, the methods described herein can additionally, or alternatively, be enabled when the fog lamps are automatically activated via sensing. A sensor configured to detect fog can comprise any sensor configured to enable detection of a haze and/or of limited visibility range, such as a visual light camera. The sensor could indicate fog intensity in some examples.

In some examples it is sufficient for just a set of one or more front fog lamps to be active in order to indicate the presence of fog, and it is sufficient for just a set of one or more rear fog lamps to be active in order to indicate the presence of fog, and it is not necessary for both sets to be active in order to indicate the presence of fog.

Figure 4:
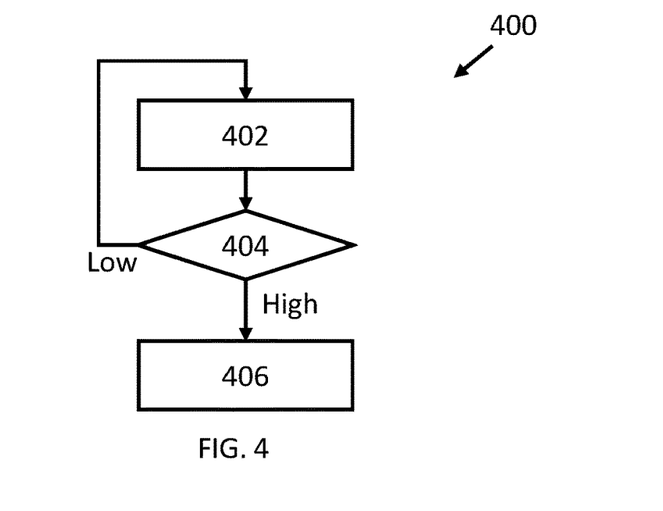
FIG. 4 illustrates an example of a method.

FIG. 4 illustrates an example of a weather-dependent control method 400 implemented by the control system 200, the method 400 comprising:

at operation 402, receiving information indicative of a weather condition, such as information indicating an adverse weather condition;

at optional operation 404, determining the intensity of the weather condition; and at operation 406, in dependence on the information indicative of a weather condition and the intensity being greater than a threshold, modifying at least one spatial range parameter of a driver assistance system configured to monitor other road users.

For the implementation of operation 402, the information indicative of a weather condition can comprise any one or more of the signals described above. In some examples, the signals themselves can indicate adverse weather conditions, for example when the information indicates a windscreen wiper on-state or a fog lamp on-state. In some examples, the control system 200 can itself determine whether the information indicates an adverse weather condition, for example when the information comprises sensor data.

If no adverse weather-indicating signal is received or the signal is found by the control system 200 not to indicate an adverse weather condition (windscreen wiper off state, fog lamp off state), the method 400 may not proceed and can loop to receive updated information at a predetermined frequency.

Operation 404 is an optional decision block for reducing unintended activations of the method 400. Operation 404 is configured to determine whether the adverse weather condition is intense enough to justify proceeding with the mitigation action of operation 406. A threshold intensity could be implemented.

The decision is optional because it is not required if the information cannot discriminate between different weather intensities (e.g. fog lamp on/off state). The decision is useful for any information that can indicate intensity, such as the plurality of different windscreen wiper on-states individually indicating a different wiper speed, or the sensor data (variable) from the rain sensor 216.

In an example, the method 400 does not proceed if the information indicates a first, relatively low intensity greater than a zero intensity but below the threshold intensity. For example, the information can comprise a first windscreen wiper on-state that indicates a first windscreen wiper speed greater than zero.

The method 400 is capable of proceeding when the information indicates a second, relatively high intensity, above the threshold intensity. The second intensity is relatively higher than the first intensity. For example, the information can comprise a second windscreen wiper on-state that indicates a second windscreen wiper speed, faster than the first windscreen wiper speed. An example second speed corresponds to a value somewhere between approximately 45 sweeps per minute and approximately 65 sweeps per minute. Two sweeps are completed to return a windscreen wiper to its starting position.

Operation 406 is a mitigation action configured to modify the spatial range parameter of the driver assistance system, to provide an extra margin for the assumed greater likelihood of driver error due to weather-induced reduced spatial awareness. Examples are described below with reference to FIGS. 5-7.

Figure 5:
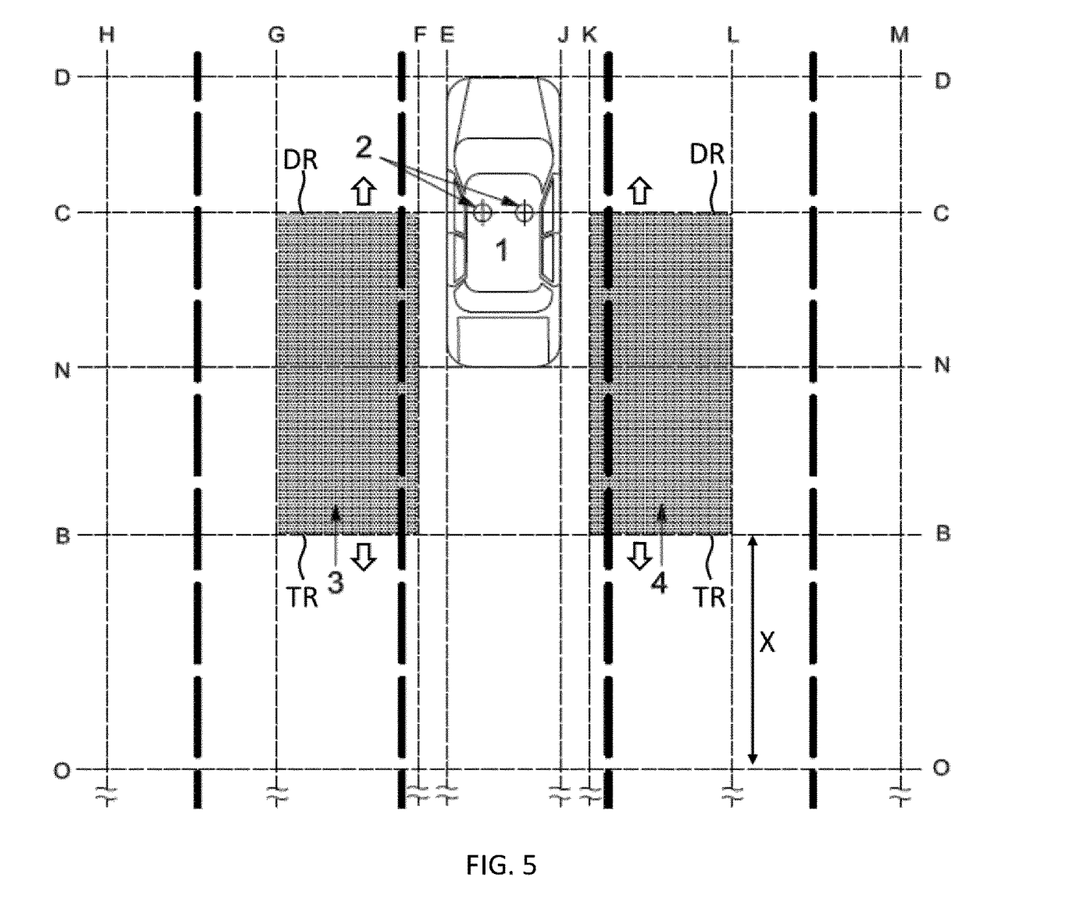
FIG. 5 illustrates an example of an alert trigger range of a blind spot monitoring function.

A first example of a weather mitigation action for blind spot monitoring is described with reference to FIG. 5. FIG. 5 schematically illustrates a top-down view of a host vehicle 1 travelling along a road. Possible locations 2 of the centre of the $95^{th}$ percentile eyelipse of the driver are marked, depending on whether the host vehicle 1 is right-hand drive or left-hand drive.

A laterally-extending straight line N-N intersects the rear of the host vehicle 1, representing the point at which the front of a passing road user overlaps the host vehicle 1 when viewed in the lateral direction.

In FIG. 5, a laterally-extending straight reference line B-B behind N-N represents the default trigger range TR for initiating the blind spot warning alert, assuming no adverse weather conditions. A road user at this location is entering the rear quarter blind spot of the host vehicle 1. Of course, the trigger range TR may not be as straight as illustrated. Example values for default trigger ranges are given earlier in the specification.

When an adverse weather condition is detected by the method 400, the trigger range TR for a blind spot warning alert is moved further away from the host vehicle 1 than line B-B. A laterally-extending straight line O-O behind B-B represents the furthest distance by which the method 400 is allowed to move the trigger range TR. Line O-O could be approximately two metres behind line B-B in the case of a blind spot warning, give or take one metres for different implementations.

In some examples, the distance by which the trigger range TR is moved depends on the intensity of the adverse weather condition. For example, intensity above a first minimum threshold intensity (e.g. moderate rain) can cause the trigger range TR to be moved by a first distance (e.g. X/2) behind line B-B. Intensity above a second greater minimum threshold intensity (e.g. heavy rain) can cause the trigger range TR to be moved by a second further distance (e.g. X, up to O-O) behind line B-B. X is the distance between B-B and O-O The first minimum threshold intensity can correspond to the threshold intensity of decision block 404. An example of the second minimum threshold intensity corresponds to the above-defined second windscreen wiper speed.

If the adverse weather condition comprises fog, the trigger range TR can be moved by the second distance. Alternatively, the trigger range TR can be moved by the first distance or by a variable distance for fog.

Additionally, or alternatively, the deactivation range DR of the blind spot warning can be adjusted by adverse weather. A laterally-extending straight line C-C represents the default deactivation range DR configured to stop rendering of the blind spot warning alert. Of course, the deactivation range DR may not be as straight as illustrated.

The position of the deactivation range line C-C is configured so that when the front of the passing road user reaches the deactivation range DR, the other road user is no longer in the rear quarter blind spot. Line C-C can intersect the putative eyelipse centre location 2. Line C-C is behind the front of the host vehicle 1.

When an adverse weather condition is detected by the method 400, the deactivation range DR can optionally be moved forwards (+x) of line C-C. The laterally-extending straight line D-D may represent the furthest distance by which the method 400 is allowed to move the deactivation range DR. The line D-D intersects the front of the host vehicle 1, representing the point at which the rear of a passing road user no longer overlaps the host vehicle 1 when viewed in the lateral direction.

In some examples, the distance by which the deactivation range DR is moved depends on the intensity of the adverse weather condition. For example, a minimum threshold intensity (e.g. heavy rain) can cause the deactivation range DR to be moved forward of line C-C. Optionally, the minimum threshold intensity is the same as the second minimum threshold intensity described above in relation to the trigger range TR. In an example, the deactivation range DR can be moved all the way or at least half of the way to line D-D (front of host vehicle 1), but not forward of line D-D because the other road user should already be very visible to the driver.

From FIG. 5 it will be understood that the longitudinal length of an alert-active area 3, 4 (shaded area of FIG. 5) is defined as the longitudinal distance between the boundary lines B-B and C-C. A result of moving the trigger range TR and/or the deactivation range DR is that the longitudinal length of the alert-active area 3, 4 increases, as much as O-O to D-D.

FIG. 5 also shows longitudinal reference lines. The lateral width of a left alert-active area 3 to the left side of the host vehicle 1 is defined as the distance between longitudinally-extending boundary lines G-G and F-F. The lateral width of a right alert-active area 4 to the right side of the host vehicle 1 is defined as the distance between longitudinally-extending boundary lines K-K and L-L (right side). These boundary lines are configured to position the alert-active areas 3, 4 in adjacent road lanes and do not have to be as straight as illustrated. In the present disclosure, but not necessarily all examples, the lateral widths of the alert-active areas 3, 4 are not changed by the information indicative of a weather condition.

In the above example, the host vehicle 1 is being overtaken by the other road user. In some examples, the blind spot monitoring function is configured to provide its output based on an overtaken/approached other road user. In this example, the trigger range can be moved from C-C towards D-D rather than from B-B towards O-O. In some examples, the trigger range can be moved when the relative speed is less the 15 kph(+/−5 kph). The deactivation range can be moved from B-B towards O-O.

The above example refers to a blind spot warning function. In the case of a closing vehicle sensing function, the trigger range TR is defined as a closing time. In this situation, line B-B represents the default closing time, examples of which are given earlier in the specification. The weather-adjusted line O-O can be up to X seconds of closing time behind line B-B, wherein X is between approximately 0.2 seconds and approximately 2 seconds depending on the implementation. In some examples, different intensities can result in different increases (e.g. moderate/heavy as described earlier).

For closing vehicle sensing, the deactivation range DR can be expressed as a distance rather than a time, and can optionally have some or all features in common with the deactivation range DR of a blind spot warning function.

If the host vehicle 1 is equipped with blind spot assist, then the shaded alert-active area 3, 4 is also the area in which a lane change manoeuvre of the host vehicle 1 can be countered by applying counter-rotational steering force.

Moving on to the other driver assistance systems, a cross-traffic function can also be made weather-dependent. Borrowing the terminology of FIG. 5, the trigger range for laterally approaching road users can be defined by the longitudinally-extending line G-G for an approach from the left side of the host vehicle 1, and by the longitudinally-extending line L-L for an approach from the right side of the host vehicle 1. Of course, the lines G-G and L-L would extend much further from the sides of the host vehicle 1 than shown in FIG. 5, in the case of the cross-traffic function.

For cross-traffic, the lines G-G and L-L can be defined as a default closing time, examples of which are described earlier in the specification. The weather-adjustment can be up to X seconds of closing time further away from the host vehicle 1, wherein X is between approximately 0.2 seconds and approximately 2 seconds depending on the implementation. In some examples, different intensities can result in different adjustments (e.g. moderate/heavy as described earlier).

The deactivation range of the cross-traffic function could be weather-adjusted. For example, the cross-traffic function could remove the alert and/or the braking when the rear of the other road user has completely passed line J-J (far lateral side of host vehicle 1).

Figure 6:
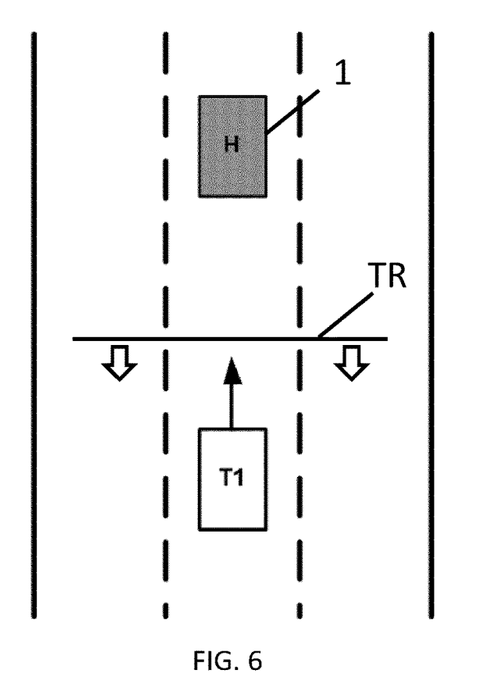
FIG. 6 illustrates an example of a trigger range of a pre-crash function.

Moving on to the other driver assistance systems, an example of a weather mitigation action for a pre-crash function is now described with reference to FIG. 6. FIG. 6 schematically illustrates a top-down view of a host vehicle 1 travelling along a road. A detected road user T1 approaches the host vehicle 1 from behind and approaches a default trigger range TR of the pre-crash function, similar to line B-B of FIG. 5.

In an example, the default trigger range TR has been calculated by the at least one probability function. The trigger range TR can be defined as a default closing time, examples of which are described earlier in the specification.

In this example, the weather-adjustment can modify the at least one probability function which can have the effect of increasing the trigger range TR. The trigger range TR can be up to an extra X seconds of closing time further away from the host vehicle 1, wherein X satisfies the condition (default trigger range+increased trigger range<1.4 seconds). In some examples, different intensities can result in different increases (e.g. moderate/heavy as described earlier).

The example of FIG. 6 illustrates a trigger range TR for mitigating a rear collision. If trigger ranges exist for mitigating side collisions and/or frontal collisions, the weather-dependent movement of their respective trigger ranges can be up to the value described above, or less.

Figure 7:
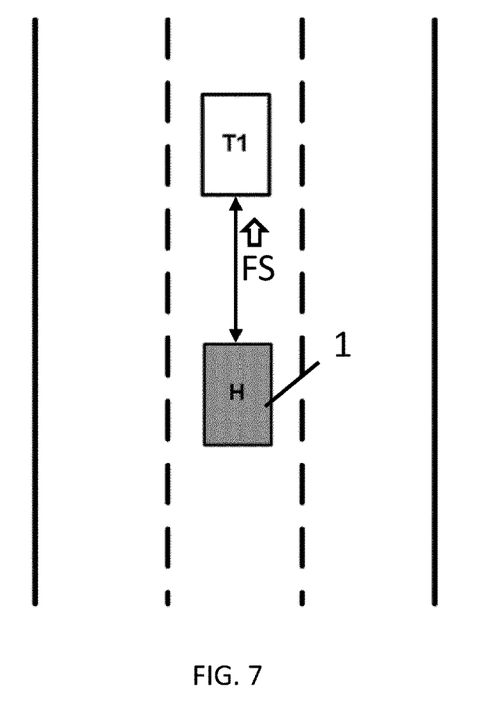
FIG. 7 illustrates an example of a following separation of an autonomous driving function.

Moving onto the other driver assistance systems, an example of weather-based control of ACC is described with reference to FIG. 7. FIG. 7 illustrates the host vehicle 1 with ACC active, following another road user T1. A double-headed arrow from the front of the host vehicle 1 to the rear of the followed vehicle illustrates a following separation parameter 'FS', also referred to as a target V2V separation. In this example, the V2V separation FS is the separation time-dependent separation distance between the host vehicle 1 and the other road user T1. For example, the V2V separation FS can be a distance that provides a gap of approximately two seconds between the vehicles.

When the method 400 determines adverse weather conditions, the V2V separation FS can be increased automatically, without driver intervention. The V2V separation can be increased up to an extra 1-2 seconds of separation between the vehicles, or 0.5 to 2 metres. In some examples, different intensities can result in different increases (e.g. moderate/heavy as described earlier).

In conclusion, a host vehicle 1 equipped with one or more driver assistance systems that operate on the same or similar principles to the examples described above can benefit from weather-dependent mitigation, to provide an extra margin for driver error in poor-visibility conditions.

Having performed the relevant adverse-weather adjustments to the spatial range parameters described above, the method 400 may loop back and monitor for information indicating whether the weather is still adverse and/or sufficiently intense. When the weather becomes no longer adverse or not intense enough, the various spatial range parameters may change towards their default values, with or without hysteresis.

For purposes of this disclosure, it is to be understood that the controller(s) described herein can each comprise a control unit or computational device having one or more electronic processors. A host vehicle 1 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor (s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method and/or sections of code in the computer program 208. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

For example, a further example of a weather information source is a source of traction information such as a controller of a traction control system, because a loss of traction can be attributed to bad weather. The source of traction information may monitor a set of wheel speed sensors of the host vehicle 1. The wheel speeds can be compared with vehicle speed over ground (e.g. average speed) to determine the traction information. A high intensity of the traction information can indicate a loss of traction (e.g. deviation of individual wheel speeds from vehicle speed). Wheel torque based on positive/negative torque requests can be determined to evaluate whether the cause of the loss of traction is the result of excessive requested torque. If the requested torque is not excessive, an inference can be made that the loss of traction is caused by a low-friction surface such as a wet surface (aquaplaning) or an icy/snowy surface. Therefore, an inference is made regarding weather conditions.

In some examples, the trigger range is increased in dependence on the traction information indicating a loss of traction. In some examples, the trigger range is increased variably in dependence on an intensity of the traction information.

In some examples, the following separation parameter is increased in dependence on the traction information. In some examples, the following separation parameter is increased variably in dependence on an intensity of the traction information.

Another possible indicator of weather is a selected terrain mode, wherein the vehicle comprises a plurality of selectable terrain modes. Terrain modes are sets of configurations for vehicle subsystems, that are optimised for different driving surfaces (terrains). The terrain modes can include a terrain mode optimised for icy/snowy roads (low-traction due to adverse weather conditions), such as a 'Grass/Gravel/Snow' mode. The terrain mode can be manually selected via HMI and/or can be automatically activated.

In the above example, the trigger range/following separation parameter can be increased in dependence on entry to the terrain mode indicating a terrain optimised for adverse weather conditions.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle, the control system comprising one or more controllers, wherein the control system is configured to:
   receive information indicative of a weather condition;
   in dependence on the information indicative of a weather condition, modify at least one spatial range parameter of a driver assistance system configured to monitor other road users; and
   in dependence on a detected range of another road user, cause an actuator of the vehicle to perform an action comprising at least one of: collision avoidance action; and a collision mitigation action,
   wherein the driver assistance system comprises a blind spot monitoring function and the at least one spatial range parameter comprises an exit condition range for ending a blind spot monitoring action, and
   wherein the control system is configured, in dependence on the information indicating an adverse weather condition, to move the exit condition range to a point at which a rear of a passing road user no longer overlaps the vehicle when viewed in a lateral direction.

2. The control system of claim 1, wherein the information is configured to indicate a wet driving condition.

3. The control system of claim 2, wherein modifying the at least one spatial range parameter is enabled when a windscreen wiper arrangement is automatically controlled due to rain-sensing and is not enabled when the windscreen wiper arrangement is manually controlled.

4. The control system of claim 2, wherein the information configured to indicate a wet driving condition is dependent on at least one of:
   information from a sensor configured to detect droplet presence;
   a windscreen wiper state; or
   traction information configured to indicate a loss of traction due at least partially to a wet road.

5. The control system of claim 1, wherein the information is configured to indicate fog.

6. The control system of claim 5, wherein the information configured to indicate fog is dependent on at least one of:
   a fog lamp state; or
   an output of a sensor configured to detect fog.

7. The control system of claim 1, wherein the information is indicative of an intensity of the weather condition, and wherein the control system is configured to modify the at least one spatial range parameter by different extents in dependence on the intensity.

8. The control system of claim 7, wherein the control system is configured to not modify the at least one spatial range parameter when the information indicates a first intensity greater than a zero intensity, and is configured to modify the at least one spatial range parameter when the information indicates a second intensity greater than the first intensity.

9. The control system of claim 1, wherein the at least one spatial range parameter comprises a trigger range for triggering an action based on a detected range of the passing road user.

10. The control system of claim 9, wherein the control system is configured to increase the trigger range in dependence on the information indicating an adverse weather condition, and not increase the trigger range in dependence on the information not indicating an adverse weather condition.

11. The control system of claim 9, wherein the action comprises a driver alert related to the passing road user.

12. The control system of claim 1, wherein the exit condition range is defined by a laterally extending line with respect to the vehicle hosting the control system.

13. The control system of claim 12 wherein the control system is configured, in dependence on the information not indicating an adverse weather condition, to set the exit range condition such that when a front of the passing road user reaches the exit condition range, the passing road user is no longer in a rear quarter blind spot of the host vehicle.

14. A vehicle comprising the control system of claim 1.

15. The control system of claim 1, wherein the information is configured to indicate a snowy and/or icy surface condition, and wherein the information comprises a selected terrain mode.

16. A control system for a vehicle, the control system comprising one or more controllers, wherein the control system is configured to:
   receive information indicative of a weather condition;
   in dependence on the information indicative of a weather condition, modify at least one spatial range parameter of a driver assistance system configured to monitor other road users, wherein the at least one spatial range parameter comprises a trigger range for triggering an action based on a detected range of another road user, wherein the driver assistance system comprises a blind spot monitoring function and the at least one spatial range parameter comprises an exit condition range for ending a blind spot monitoring action; and in dependence on the detected range of another road user, cause an actuator of the vehicle to perform an action comprising at least one of: a collision avoidance action; and a collision mitigation action, wherein the control system is configured to increase the trigger range in dependence on the information indicating an adverse weather condition, and not increase the trigger range in dependence on the information not indicating an adverse weather condition, wherein the driver assistance system comprises a pre-crash function, wherein the control system is configured, in dependence on the information indicating the adverse weather condition, to move the exit condition range to a point at which a rear of a passing road user no longer overlaps the vehicle when viewed in a lateral direction.

17. The control system of claim 16, wherein the collision mitigation action comprises at least one of:
seatbelt pre-tensioning by a seatbelt pre-tensioner actuator;
window closing by an electric window actuator;
sunroof closing by an electric sunroof actuator;
headrest movement by a headrest adjustment actuator;
seat repositioning by the headrest adjustment actuator;
airbag pre-deployment;
hydraulic brake prefilling by a brake actuator; or
active suspension adjustment by an active suspension actuator; and/or
wherein the collision avoidance action comprises at least one of:
autonomous emergency braking; or
driver braking assistance.

18. The control system of claim 16, wherein the information is configured to indicate a snowy and/or icy surface condition, and wherein the information comprises a selected terrain mode.

19. A method of controlling a driver assistance system of a vehicle, the method comprising:
receiving information indicative of a weather condition;
in dependence on the information indicative of a weather condition, modifying at least one spatial range parameter of a driver assistance system configured to monitor other road users, wherein the driver assistance system comprises a blind spot monitoring function; and
in dependence on a detected range of another road user, cause an actuator of the vehicle to perform an action comprising at least one of: a collision avoidance action; and a collision mitigation action,
wherein the at least one spatial range parameter comprises an exit condition range for ending a blind spot monitoring action, and
wherein modifying said at least one spatial range parameter comprises, in dependence on the information indicating an adverse weather condition, moving the exit condition range to a point at which a rear of a passing road user no longer overlaps the vehicle when viewed in the lateral direction.

20. A non-transitory, computer-readable medium having stored thereon computer software that, when executed by a processor, is arranged to perform a method according to claim 19.

* * * * *